(12) United States Patent
Koetting et al.

(10) Patent No.: US 8,309,248 B2
(45) Date of Patent: Nov. 13, 2012

(54) BATTERY CELL CARRIER ASSEMBLY HAVING A BATTERY CELL CARRIER FOR HOLDING A BATTERY CELL THEREIN

(75) Inventors: William Koetting, Davisburg, MI (US);
Kwok Tom, Madison Heights, MI (US);
Martin J. Klein, Grosse Pointe Park, MI (US); Prabhakar Patil, Southfield, MI (US); Kelly Kebl, Berkley, MI (US)

(73) Assignee: LG Chem, Ltd., Seoul (KR)

( * ) Notice: Subject to any disclaimer, the term of this patent is extended or adjusted under 35 U.S.C. 154(b) by 1424 days.

(21) Appl. No.: 11/828,927

(22) Filed: Jul. 26, 2007

(65) Prior Publication Data

US 2009/0029239 A1    Jan. 29, 2009

(51) Int. Cl.
*H01M 2/02* (2006.01)
(52) U.S. Cl. ......................................... 429/162; 429/100
(58) Field of Classification Search .................. 429/120, 429/127, 148, 151–155, 162–163, 99
See application file for complete search history.

(56) References Cited

U.S. PATENT DOCUMENTS

| | | | |
|---|---|---|---|
| 4,693,946 A * | 9/1987 | Niksa et al. | 429/405 |
| 4,950,561 A | 8/1990 | Niksa et al. | |
| 5,487,958 A | 1/1996 | Tura | |
| 6,362,598 B2 | 3/2002 | Laig-Horstebrock et al. | |
| 6,696,196 B1 * | 2/2004 | Eilers | 429/56 |
| 6,709,783 B2 | 3/2004 | Ogata et al. | |
| 6,724,172 B2 | 4/2004 | Koo | |
| 6,821,671 B2 | 11/2004 | Hinton et al. | |
| 7,250,741 B2 | 7/2007 | Koo et al. | |
| 7,479,758 B2 | 1/2009 | Moon | |
| 7,597,992 B2 * | 10/2009 | Kanai et al. | 429/53 |
| 7,976,980 B2 | 7/2011 | Yoon et al. | |
| 8,202,645 B2 | 6/2012 | Young | |
| 2006/0234119 A1 | 10/2006 | Kruger et al. | |
| 2007/0072066 A1 * | 3/2007 | Yoon et al. | 429/99 |
| 2007/0141457 A1 | 6/2007 | Amagai | |
| 2007/0207377 A1 | 9/2007 | Han et al. | |
| 2008/0187820 A1 * | 8/2008 | Nakano et al. | 429/83 |
| 2010/0266883 A1 | 10/2010 | Koetting et al. | |
| 2011/0256446 A1 | 10/2011 | Bronczyk et al. | |

FOREIGN PATENT DOCUMENTS

| | | |
|---|---|---|
| KR | 20070012809 A | 1/2007 |
| KR | 100905393 B1 | 6/2009 |
| KR | 100921346 B1 | 10/2009 |
| WO | 2006059455 A | 6/2006 |
| WO | 2006093010 A | 9/2006 |
| WO | 2006101342 A | 9/2006 |
| WO | WO 2006/101343 A1 * | 9/2006 |

* cited by examiner

*Primary Examiner* — Maria J Laios
(74) *Attorney, Agent, or Firm* — Buckert Patent & Trademark Law Firm, P.C.; John F. Buckert

(57) ABSTRACT

A battery cell carrier assembly having a battery cell carrier for holding a battery cell is provided. The battery cell carrier includes a trapping member for holding the battery cell. The battery cell carrier has at least one aperture extending therethrough for allowing air to flow therethrough to contact the first side of the battery cell for cooling the battery cell. The battery cell carrier further includes a panel member configured to be coupled to the trapping member for holding the battery cell therebetween. The panel member has at least one aperture extending therethrough for allowing air to flow therethrough to contact the battery cell for cooling the battery cell.

6 Claims, 9 Drawing Sheets

BATTERY CELL CARRIER ASSEMBLY HAVING A BATTERY CELL CARRIER FOR HOLDING A BATTERY CELL THEREIN

BACKGROUND

An apparatus for holding a battery cell has been developed. However, the apparatus does not have apertures that allow air to flow therethrough to cool a battery cell. Accordingly, heat generated by the battery cell may not dissipate as desired, which may degrade the battery cell over time.

Accordingly, the inventors herein have recognized a need for a battery cell carrier assembly configured to allow air to flow therethrough for cooling a battery cell.

SUMMARY

A battery cell carrier for holding a battery cell therein in accordance with an exemplary embodiment is provided. The battery cell has a first side and a second side opposite the first side. The battery cell carrier includes a trapping member configured to contact at least a portion of the first side of the battery cell. The trapping member has at least one aperture extending therethrough for allowing air to flow therethrough to contact the first side of the battery cell for cooling the battery cell. The battery cell carrier further includes a panel member configured to contact at least a portion of the second side of the battery cell. The panel member is further configured to engage a portion of the trapping member such that the battery cell is held between the panel member and the trapping member. The panel member has at least one aperture extending therethrough for allowing air to flow therethrough to contact the second side of the battery cell for cooling the battery cell.

A battery cell carrier assembly for holding first and second battery cells therein in accordance with another exemplary embodiment is provided. The battery cell carrier assembly includes a first battery cell carrier having a first trapping member and a first panel member. The first trapping member is configured to contact at least a portion of a first side of the first battery cell. The first trapping member has at least one aperture extending therethrough for allowing air to flow therethrough to contact the first side of the first battery cell for cooling the first battery cell. The first panel member is configured to contact at least a portion of a second side of the first battery cell opposite the first side. The first panel member is further configured to engage a portion of the first trapping member seen that the first battery cell is held between the first panel member and the first trapping member. The first panel member has at least one aperture extending therethrough for allowing air to flow therethrough to contact the second side of the first battery cell for cooling the first battery cell. The battery cell carrier assembly further includes a second battery cell carrier having a second trapping member and a second panel member. The second trapping member is configured to engage the first panel member of the first battery cell carrier. The second trapping member is further configured to contact at least a portion of a third side of the second battery cell. The second trapping member has at least one aperture extending therethrough for allowing air to flow therethrough to contact the third side of the second battery cell. The second panel member is configured to contact at least a portion of a fourth side of the second battery cell opposite the third side. The second panel member is further configured to engage a portion of the second trapping member such that the second battery cell is held between the second panel member and the second trapping member. The second panel member has at least one aperture extending therethrough for allowing air to flow therethrough to contact the fourth side of the second battery cell for cooling the second battery cell.

A method for assembling a battery cell carrier for holding a battery cell therein in accordance with another exemplary embodiment is provided. The battery cell carrier includes a trapping member and a panel member. The method includes disposing the battery cell on the trapping member. The trapping member has at least one aperture extending therethrough for allowing air to contact a first side of the battery cell for cooling the battery cell. The method further includes disposing the panel member on the trapping member such that the battery cell is held between the panel member and the trapping member. The panel member has at least one aperture extending therethrough for allowing air to contact a second side of the battery cell for cooling the battery cell.

A method for assembling a battery cell carrier assembly for holding first and second battery cells therein in accordance with another exemplary embodiment is provided. The battery cell carrier assembly has a first battery cell carrier with a first trapping member and a first panel member, and a second battery cell carrier with a second trapping member and a second panel member. The method includes disposing the first battery cell on the first trapping member. The first trapping member has at least one aperture extending therethrough for allowing air to contact a first side of the first battery cell for cooling the first battery cell. The method further includes disposing the first panel member on the first trapping member to form the first battery cell carrier such that the first battery cell is held between the first panel member and the first trapping member. The first panel member has at least one aperture extending therethrough for allowing air to contact a second side of the first battery cell for cooling the first battery cell. The method further includes disposing the second battery cell on the second trapping member. The second trapping member has at least one aperture extending therethrough for allowing air to contact a third side of the second battery cell for cooling the second battery cell. The method further includes disposing the second panel member on the second trapping member to form the second battery cell carrier such that the second battery cell is held between the second panel member and the second trapping member. The second panel member has at least one aperture extending therethrough for allowing air to contact a fourth side of the second battery cell for cooling the second battery cell. The method further includes disposing the first battery cell carrier on the second battery cell carrier to form the battery cell carrier assembly.

DETAILED DESCRIPTION OF EXEMPLARY EMBODIMENTS

Figure 1:
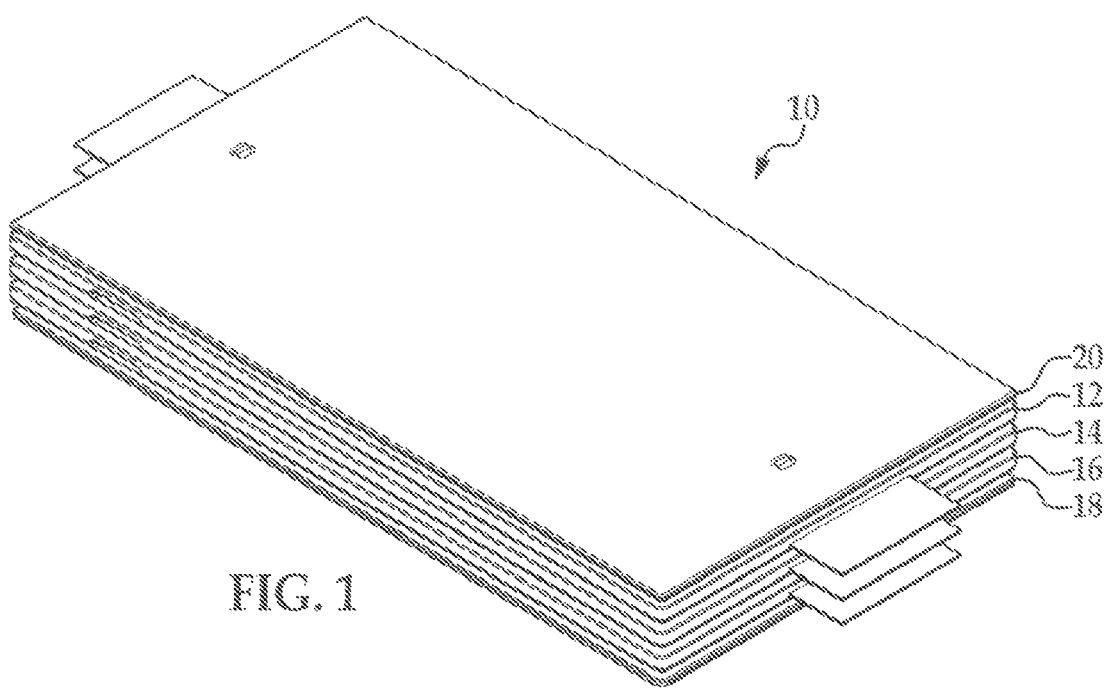
FIG. 1 is a schematic of a battery cell carrier assembly having first, second, and third battery cell carriers, and first and second endcap members, in accordance with an exemplary embodiment.
Figure 2:
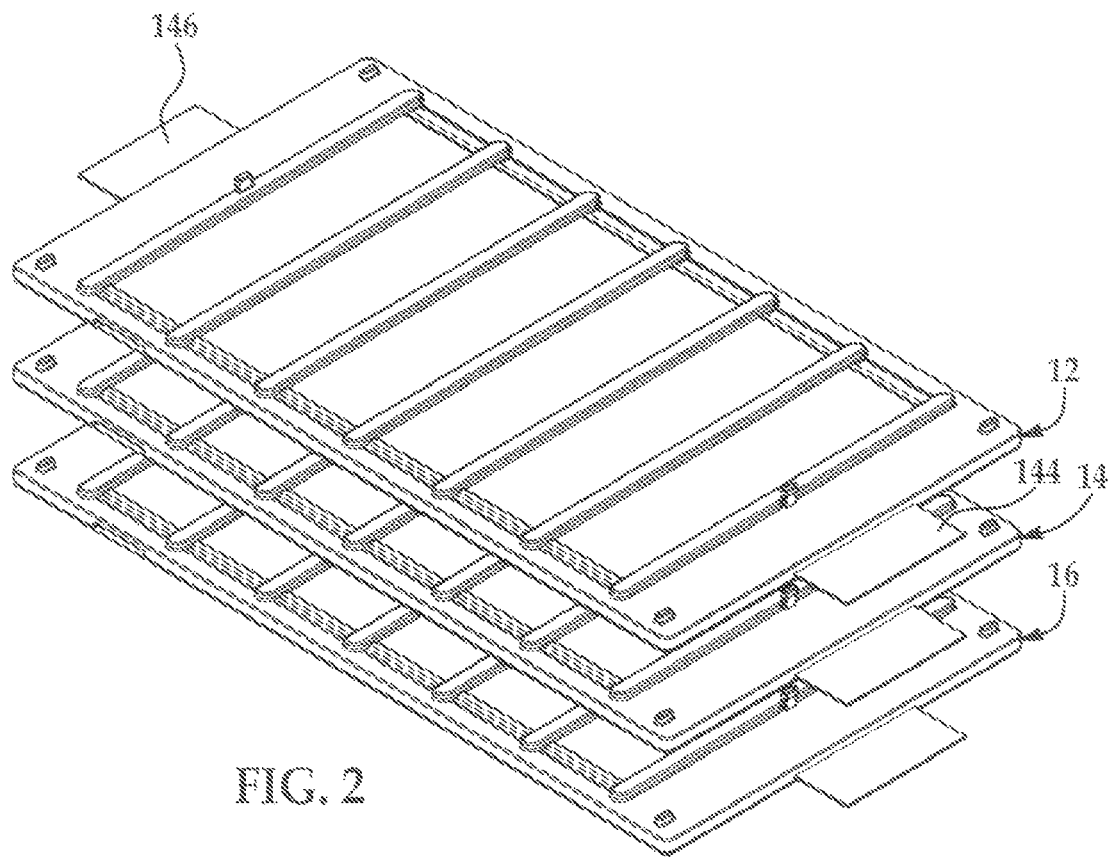
FIG. 2 is an exploded schematic of the first, second, and third battery cell carriers of the battery cell carrier assembly of FIG. 1.

Referring to FIGS. 1 and 2, a battery cell carrier assembly 10 is illustrated. The battery cell carrier assembly 10 includes battery cell carriers 12, 14, 16 and endcap members 18, 20. An advantage of the battery cell carriers 12, 14, 16 is that the carriers include apertures for allowing air to flow therethrough for cooling batteries held within the carriers.

Figure 3:
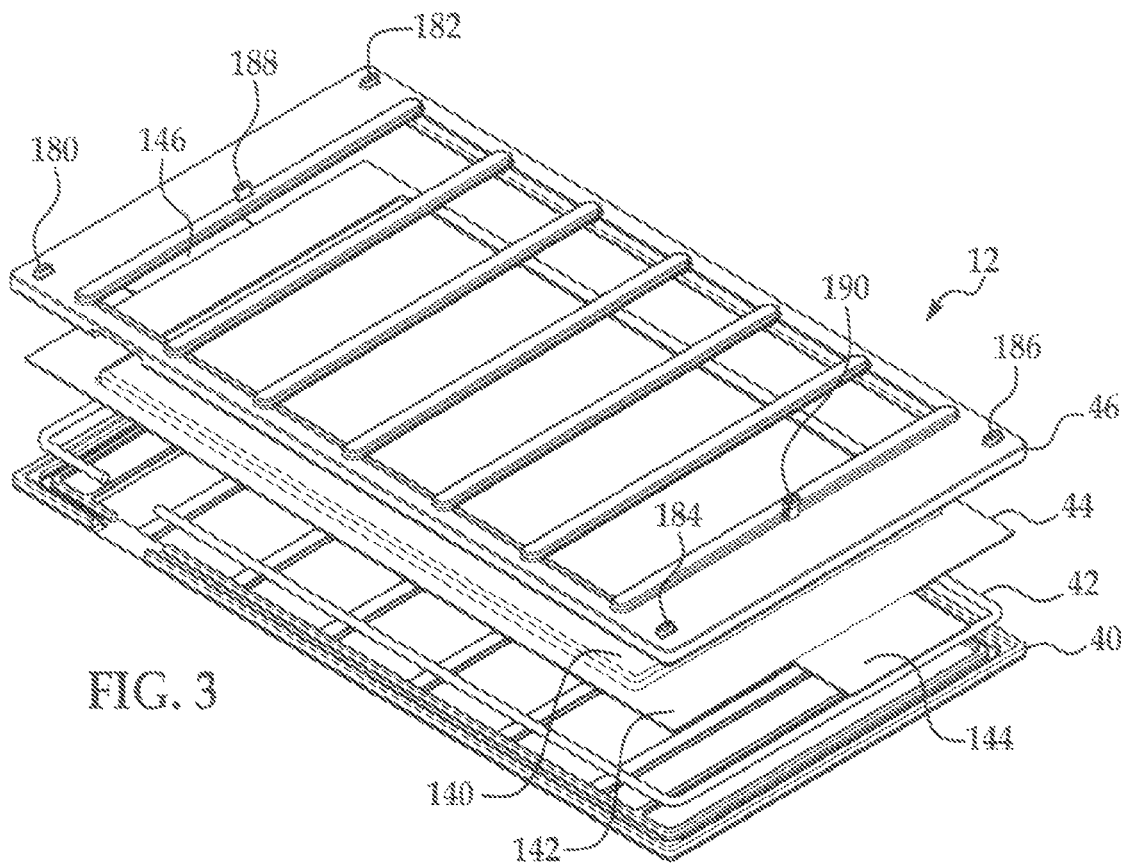
FIG. 3 is an exploded schematic of the first battery cell carrier of FIG. 1 having a trapping member and a panel member in accordance with another exemplary embodiment.

Referring to FIG. 3, the battery cell carrier 12 is provided to hold a battery cell 44 therein. The battery cell carrier 12 includes a trapping member 40, a gasket 42, and a panel member 46. As shown, the battery cell 44 is disposed between the trapping member 40 and the panel member 46.

Referring to FIGS. 4-7, the trapping member 40 is configured to contact at least a portion of a first side of the battery cell 44. The trapping member 40 includes a peripheral wall 70, cross-members 78, 80, 82, 84, 86, 88, and positioning tabs 90, 92, 94, 96. In one exemplary embodiment, the trapping member 40 is constructed from plastic.

Figure 4:
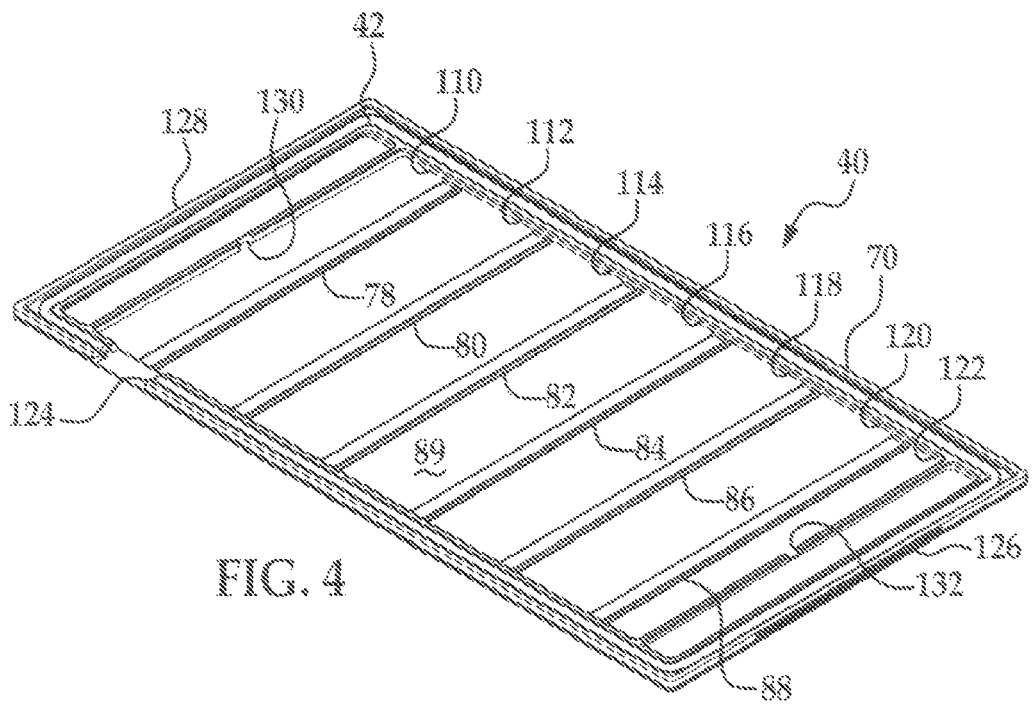
FIG. 4 is a schematic of a first side of the trapping member of the first battery cells carrier of FIG. 3.
Figure 11:
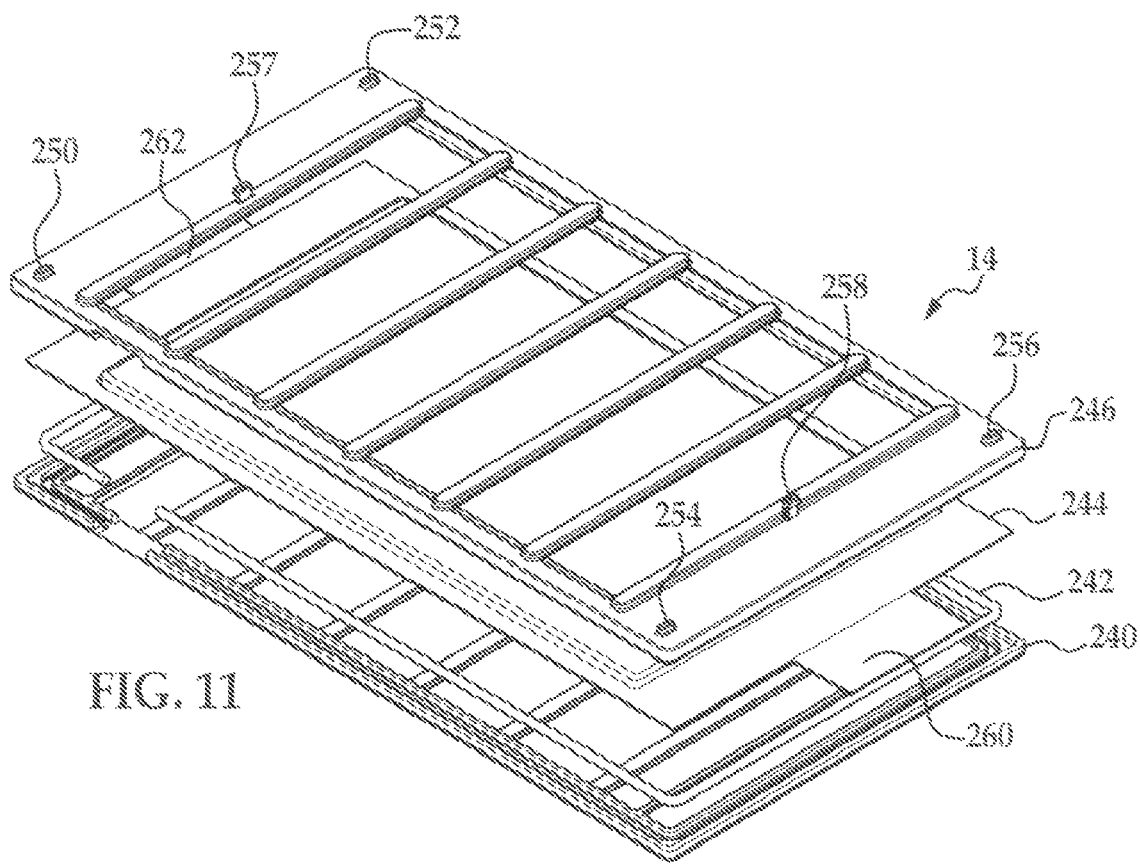
FIG. 11 is an exploded schematic of the second battery cell carrier of FIG. 1 having a trapping member and a panel member.

The peripheral wall 70 is generally rectangular ring-shaped and has a periphery of sufficient size to receive the battery cell 44 thereon. The peripheral wall 70 includes a wall portion 100 which defines a groove 102 for receiving the gasket 42 therein. In one exemplary embodiment, the gasket 42 is integrally formed to the peripheral wall 70. The peripheral wall 70 further includes an engagement portion 104 which projects upwardly from the wall portion 100. The engagement portion 104 is provided to engage a groove 204 of the panel member 46 for coupling the trapping member 40 to the panel member 46. Referring to FIGS. 4 and 11, a peripheral wall 70 further includes grooves 130, 132 formed therein for receiving latching members to 257, 258, respectively of the panel member 246 of the battery cell carrier 14 for coupling the trapping member 40 with the panel member 246. The peripheral wall 70 further includes slots 126, 128 extending therethrough for receiving electrical terminals 144, 146 of the battery cell 44 therethrough.

Referring again to FIG. 4, the cross-members 78, 80, 82, 84, 86, 88 are provided to support the battery cell 44 thereon.

The cross-members 78, 80, 82, 84, 86, 88 extend transversely across an inner region 89 defined by the peripheral wall 70 and are coupled to the peripheral wall 70. The cross-members 78, 80, 82, 84, 86, 88 are disposed apart from one another and are generally parallel to one another. The cross-members 78, 80, 82, 84, 86, 88 define a plurality of apertures 110, 112, 114, 116, 118, 120, 122 which allows air to flow therethrough for cooling the battery cell 44 disposed on the trapping member 40.

Figure 7:
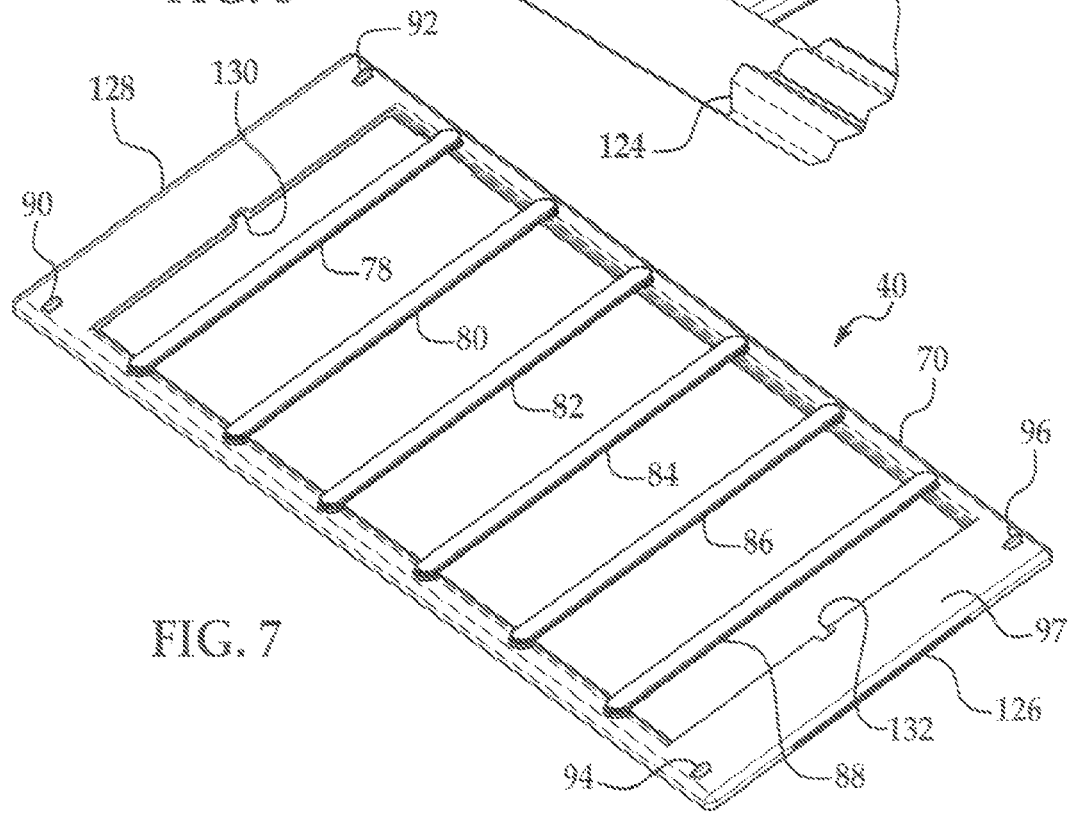
FIG. 7 is a schematic of a second side of the trapping member of the first battery cell carrier of FIG. 3.

The positioning tabs 90, 92, 94, 96 are provided to position the trapping member 40 at a desired position with respect to the battery cell carrier 14. In particular, the positioning tabs 90, 92, 94, 96 extend from a bottom surface 97 of the trapping member 40. Referring to FIGS. 7 and 11, the positioning tabs 90, 92, 94, 96 are positioned on the bottom surface 97 such that the tabs 90, 92, 94, 96 are disposed adjacent (e.g., side by side) associated tabs 250, 252, 254, 256, respectively, of the panel member 246 of the battery cell carrier 14 for positioning the trapping member 40 relative to the panel member 240. It should be noted that the positioning tabs 90, 92, 94, 96 are optional, and that in an alternative embodiment, the trapping member 40 does not have the positioning tabs 90, 92, 94, 96.

Figure 5:
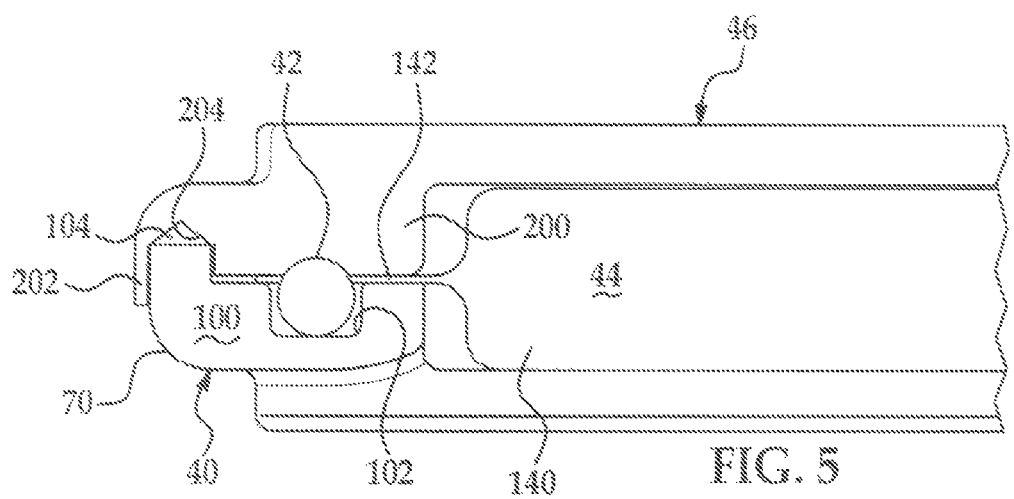
FIG. 5 is a cross-sectional schematic of a portion of the first battery cell carrier of FIG. 1.
Figure 6:
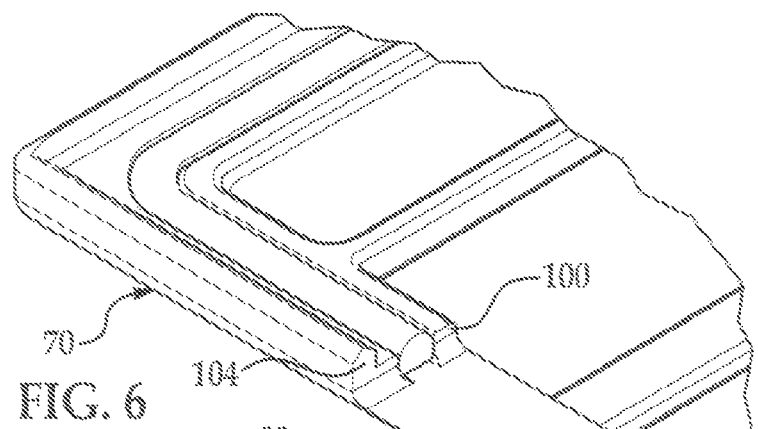
FIG. 6 is a schematic of a portion of the trapping member of the first battery cell carrier of FIG. 3.

Referring to FIGS. 4-6, the gasket 42 is provided to engage an outer lip 142 of the battery cell 44 for holding the battery cell 44 firmly against the trapping member 46. The gasket 42 is constructed from a rubber compound or similarly flexible compound and is generally rectangular ring-shaped. The gasket 42 is disposed in the groove 102 of the peripheral wall 70. A portion of the gasket 42 is removed at a venting aperture 124 that is formed in the peripheral wall 70.

Referring to FIG. 3, the battery cell 44 is provided to generate an operational voltage. The battery cell 44 includes a main body portion 140, a peripheral lip portion 142, and electrical terminals 144, 146. The main body portion 140 includes a voltage cell therein. The peripheral lip portion 142 extends around the main body portion 140 is utilized to bold the battery cell 44 within the battery cell carrier 12. The electrical terminals 144, 146 extend from the battery cell within the main body portion 140.

Figure 8:
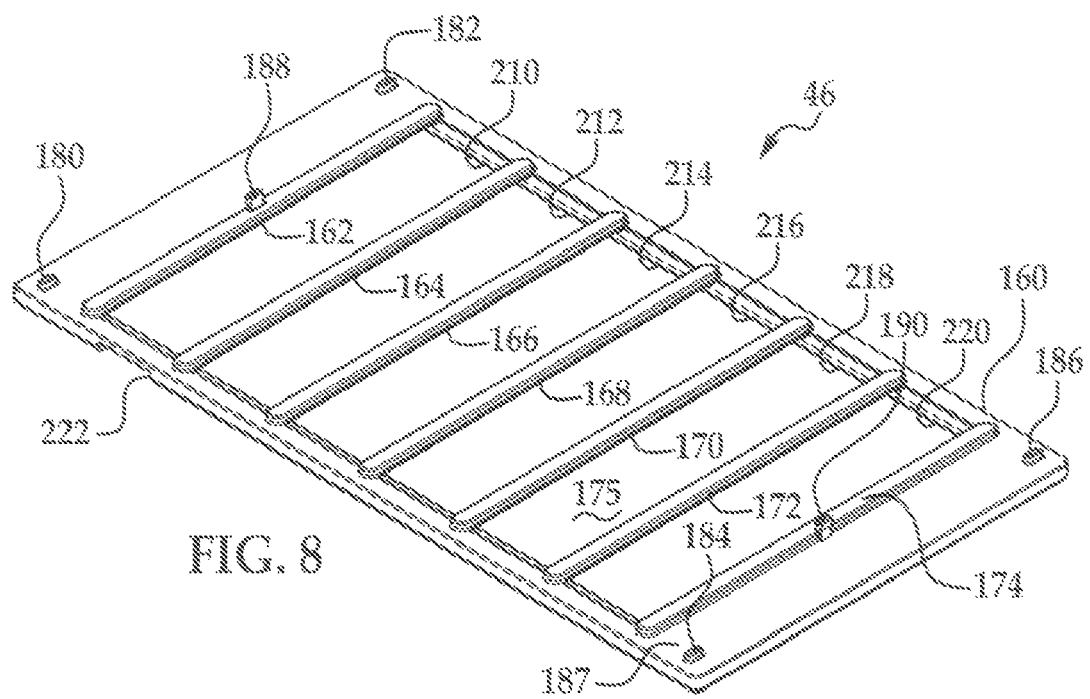
FIG. 8 is a schematic of a first side of the panel member of the first battery cell carrier of FIG. 3.
Figure 9:
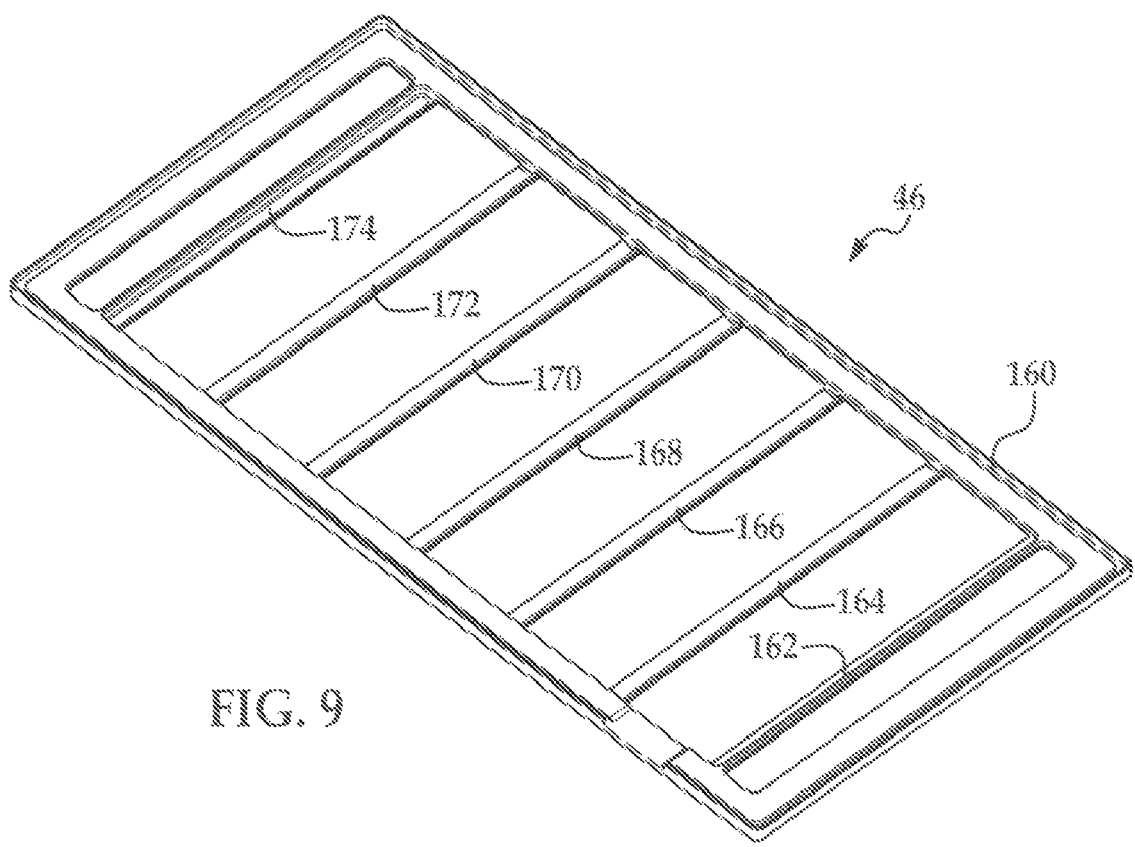
FIG. 9 is a schematic of a second side of the panel member of the first battery cell carrier of FIG. 3.
Figure 10:
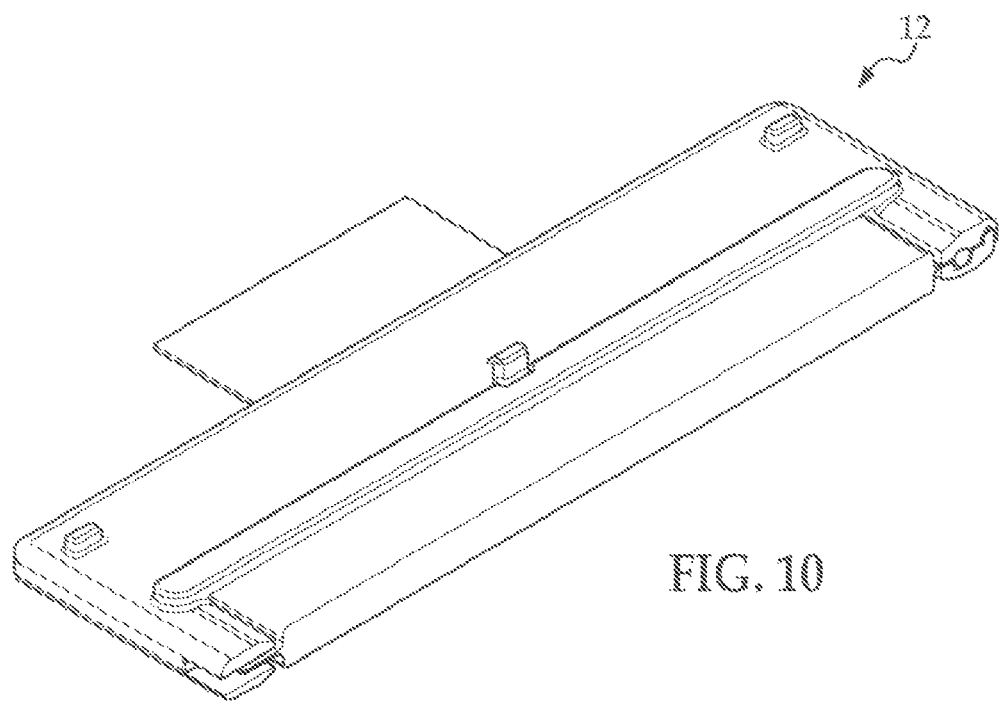
FIG. 10 is a cross-sectional schematic of the first battery cell carrier of FIG. 3.

Referring to FIGS. 8-10, the panel member 46 is configured to contact at least a portion of a second side of the battery cell 44. The panel member 46 includes a peripheral, wall 160, cross-members 162, 164, 166, 168 170, 172, 174, positioning tabs 180, 182, 184, 186, and latching members 188, 190. In one exemplary embodiment, the panel member 46 is constructed from plastic.

Figure 12:
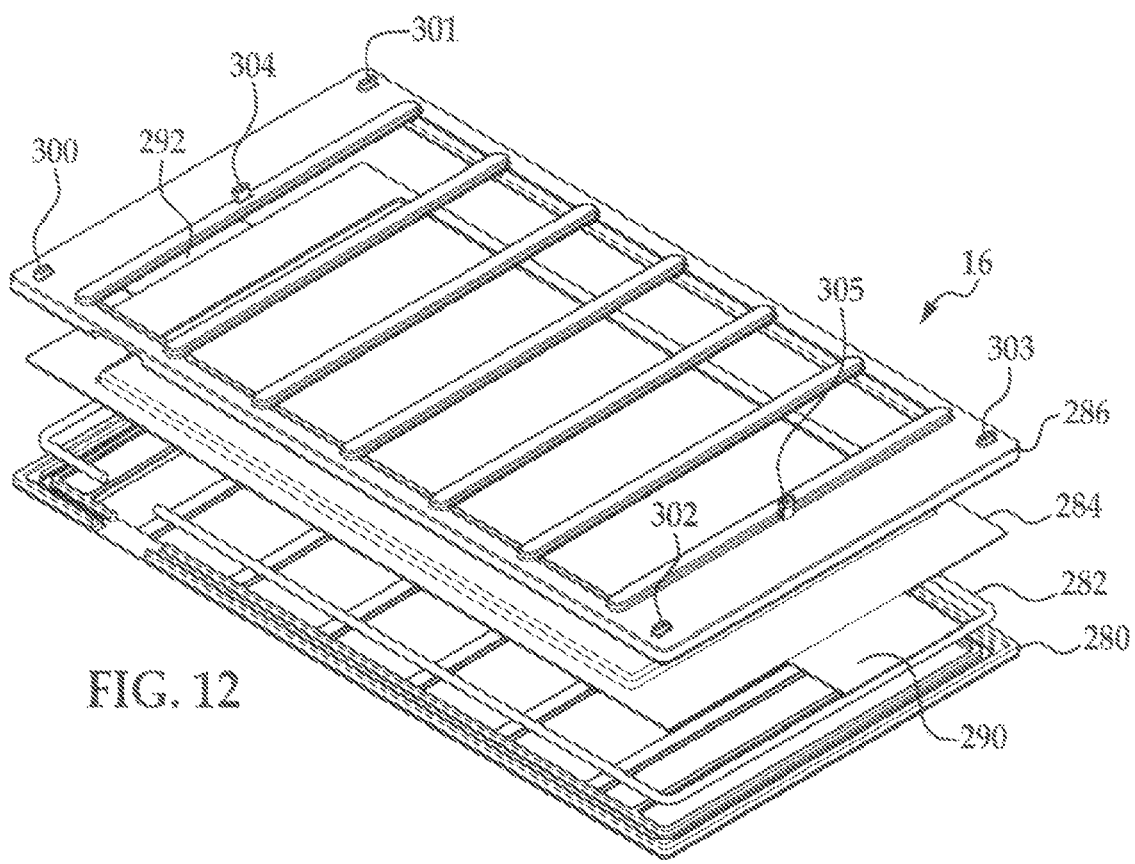
FIG. 12 is an exploded schematic of the third battery cell carrier of FIG. 1 having a trapping member and a panel member.

Referring to FIGS. 5, 8 and 12, the peripheral wall 160 is generally rectangular ring-shaped and has a periphery of sufficient size to receive the battery cell 44 thereon. The peripheral wall 160 includes a wall portion 200 which compresses the gasket 42 into the groove 102. The peripheral wall 160 further includes a groove 204 that is configured to receive the engagement portion 104 of the peripheral wall 70 of the trapping member 40 therein. The peripheral wall 160 further includes an outer extension portion 202 which extends downwardly from the wall portion 200 and surrounds an outer periphery of the peripheral wall 70 of the trapping member 70. The peripheral wall 160 further includes a venting aperture 222 that is disposed adjacent the venting aperture 124 of the panel member 44 for allowing any leakage gases from the battery cell 44 to exit the battery cell carrier 12.

Referring again to FIG. 8, the cross-members 162, 164, 166, 168, 170, 172, 174 are provided to support the battery cell 44 thereon. The cross-members 162, 164, 166, 168, 170, 172, 174 extend transversely across an inner region 175 defined by the peripheral wall 160 and are coupled to the peripheral wall 160. The cross-members 162, 164, 166, 168, 170, 172, 174 are disposed apart from one another and are generally parallel to one another. The cross-members 162, 164, 160, 168, 170, 172, 174 define a plurality of apertures 210, 212, 214, 216, 218, 220 which allow air to flow therethrough for cooling the battery cell 44 disposed against the panel member 46.

Figure 15:
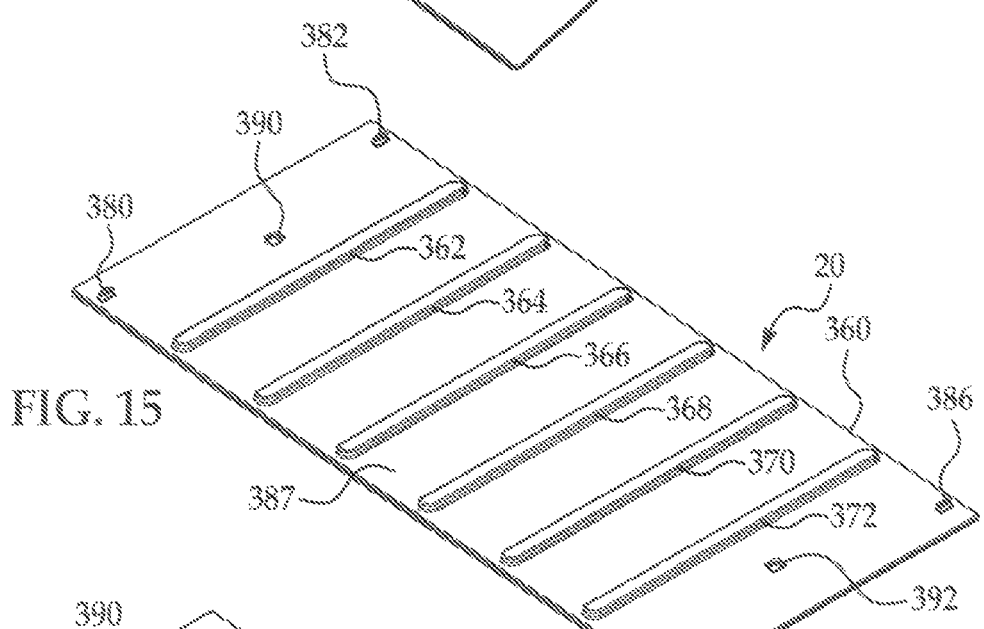
FIG. 15 is a schematic of a first side of the second endcap member of the battery cell carrier assembly of FIG. 1.

Referring to FIGS. 8 and 15, the positioning tabs 180, 182, 184, 186 are provided to position the panel member 46 at a desired position with respect to the endcap member 20. In particular, the positioning tabs 180, 182, 184, 186 extend from the top surface 187 of the panel member 46. The positioning tabs 180, 182, 184, 186 are positioned on the top surface 187 such that the tabs 180, 182, 184, 186 are disposed adjacent associated tabs 380, 382, 384, 386 of the endcap member 20 for positioning the panel member 46 relative to the endcap member 20. If should be noted that the positioning tabs 180, 182, 184, 186 are optional, and that in an alternative embodiment, the panel member 46 does not have the positioning tabs 180, 182, 184, 186.

The latching members 188, 190 are provided to couple the panel member 46 to the endcap member 20. The latching members 188, 190 extend from the top surface 187 of the panel member 46. The latching members 188, 190 are positioned on the top surface 187 such that the latching members 188, 190 are received within apertures 390, 392 of the endcap member 20 for coupling the panel member 46 to the endcap member 20. It should be noted that the panel member 46 can further be coupled to the trapping member 40 by ultrasonically welding the panel member 46 to the trapping member 40. Further, the panel member 46 can be further coupled to the endcap member 20 by ultrasonically welding the panel member 46 to the endcap member 20. It should be noted that the latching members 188, 190 are optional, and that in an alternative embodiment, the panel member 46 does not have the latching members 188, 190.

Referring to FIG. 11, the battery cell carrier 14 is provided to hold a battery cell 244 therein. The battery cell carrier 14 includes a trapping member 240, a gasket 242, and a panel member 246.

The trapping member 240 is configured to contact at least a portion of a first side of the battery cell 244. The trapping member 240 has an identical structure as the trapping member 40 described above.

The gasket 242 is provided to engage an outer lip of the battery cell 244 for holding the battery cell 244 firmly against the trapping member 240. The gasket 242 has an identical structure as the gasket 42 described above.

The battery cell 244 is provided to generate an operational voltage at electrical terminals 260, 262. The battery cell 244 has an identical structure as the battery cell 44 described above.

The panel member 246 is configured to contact at least a portion of a second side of the battery cell 244. The panel member 246 has an identical structure as the panel member 46 described above. Referring to FIGS. 7 and 11, the panel member 246 includes optional positioning tabs 250, 252, 254, 256 which are positioned to be adjacent to (e.g., side by side) positioning tabs 90, 92, 94, 96 respectively of the trapping member 40 of the battery cell carrier 12 for positioning the panel member 246 relative to the battery cell carrier 12. Further, the panel member 246 includes latching members 257, 258 which are positioned to engage grooves 130, 132 of the trapping member 40 for coupling the panel member 246 to the trapping member 40. It should be noted that the panel member 246 is further coupled to the trapping member 240 in a manner substantially similar to the technique for coupling the panel member 46 to the trapping member 40 described above.

Referring to FIG. 12, the battery cell carrier 16 is provided to hold a battery cell 284 therein. The battery cell carrier 16 includes a trapping member 280, a gasket 282, and a panel member 286.

The trapping member 280 is configured to contact at least a portion of a first side of the battery cell 284. The trapping member 280 has an identical structure as the trapping member 40 described above.

The gasket 282 is provided to engage an outer lip of the battery cell 284 for holding the battery cell 284 firmly against the trapping member 280. The gasket 282 has an identical structure as the gasket 42 described above.

The battery cell 284 is provided to generate an operational voltage at electrical terminals 290, 292. The battery cell 284 has an identical structure as the battery cell 44 described above.

The panel member 286 is configured to contact at least a portion of a second side of the battery cell 284. The panel member 286 has an identical structure as the panel member 46 described above. The panel member 286 includes positioning tabs 300, 301, 302, 303 which are positioned to be adjacent positioning tabs of the trapping member 280 of the battery cell carrier 14 for positioning the panel member 286 relative to the battery cell carrier 14. Further, the panel member 286 includes latching members 304, 305 which are positioned to engage grooves of the trapping member 240 for coupling the panel member 286 to the trapping member 240. It should be noted that the panel member 286 is further coupled to the trapping member 280 in a manner substantially similar to the technique for coupling the panel member 46 to the trapping member 40 described above.

Figure 13:
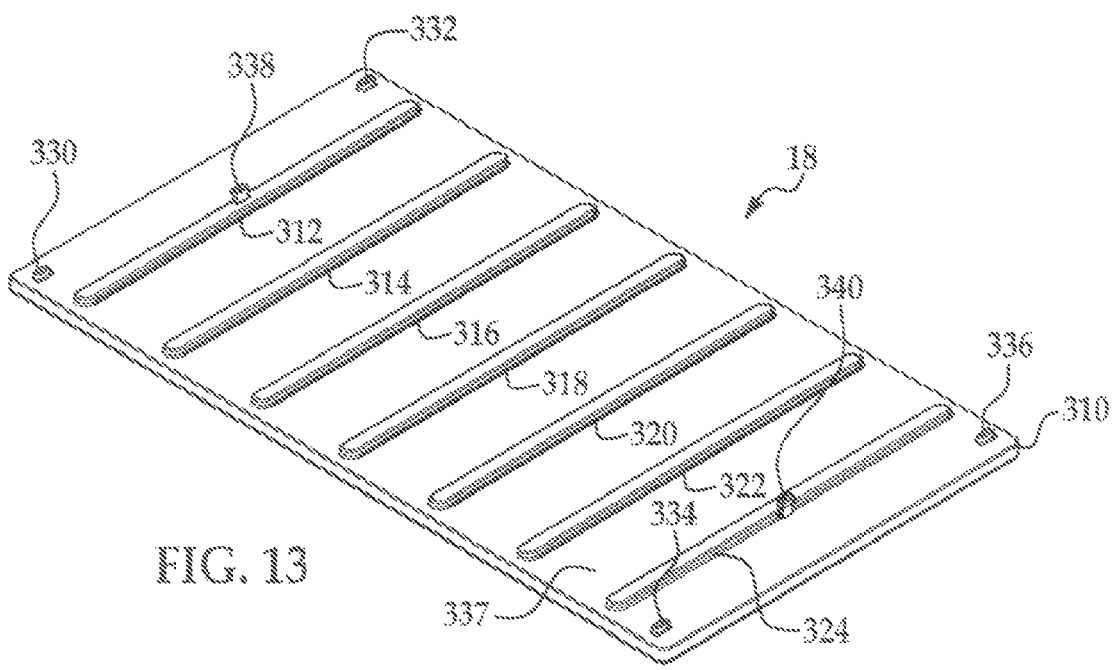
FIG. 13 is a schematic of a first side of the first endcap member of the battery cell carrier assembly of FIG. 1.
Figure 14:
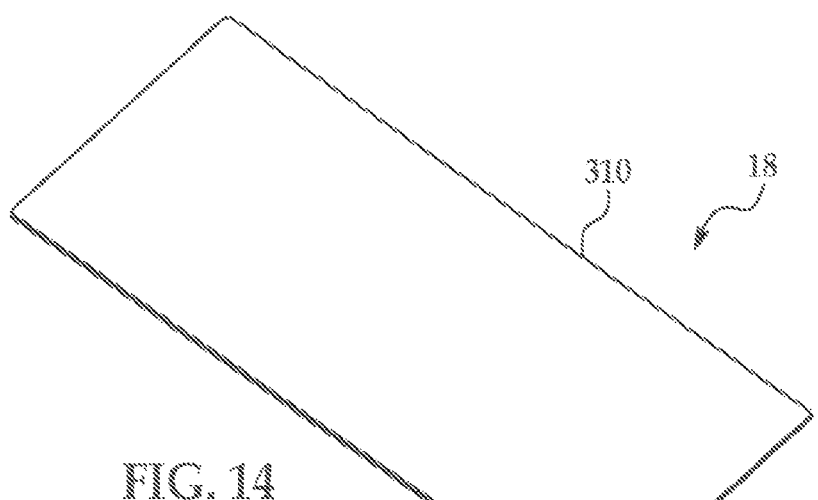
FIG. 14 is a schematic of a second side of the first endcap member of the battery cell carrier assembly of FIG. 1.

Referring to FIGS. 13 and 14, the endcap member 18 is configured to be coupled to the battery cell carrier 16. The endcap member 18 includes a plate member 310, cross-members 312, 314, 316, 318, 320, 322, 324, positioning tabs 330, 332, 334, 336 and latching members 338, 340. In one exemplary embodiment, the endcap member 18 is constructed from plastic.

The plate member 310 is substantially rectangular shaped and has an outer periphery substantially the same size as an outer periphery of the trapping member 280.

The cross-members 312, 314, 316, 318, 320, 322, 324 are provided to support the trapping member 280 thereon. The cross-members 312, 314, 316, 318, 320, 322, 324 extend transversely on the plate member 310 and are disposed apart from one another and are generally parallel to one another.

Referring to FIGS. 12 and 13, the positioning tabs 330, 332, 334, 336 are provided to position the endcap member 18 at a desired position with respect to the trapping member 280. In particular, the positioning tabs 330, 332, 334, 336 extend from the top surface 337 of the endcap member 18. The positioning tabs 330, 332, 334, 336 are positioned on the top surface 337 such that the tabs 330, 332, 334, 336 are disposed adjacent associated tabs on a bottom surface of the trapping member 280 for positioning the endcap member 18 relative to the trapping member 280.

The latching members 338, 340 extend from the top surface 337 and are positioned to engage grooves of the trapping member 280 for coupling the endcap member 18 to the trapping member 280.

Figure 16:
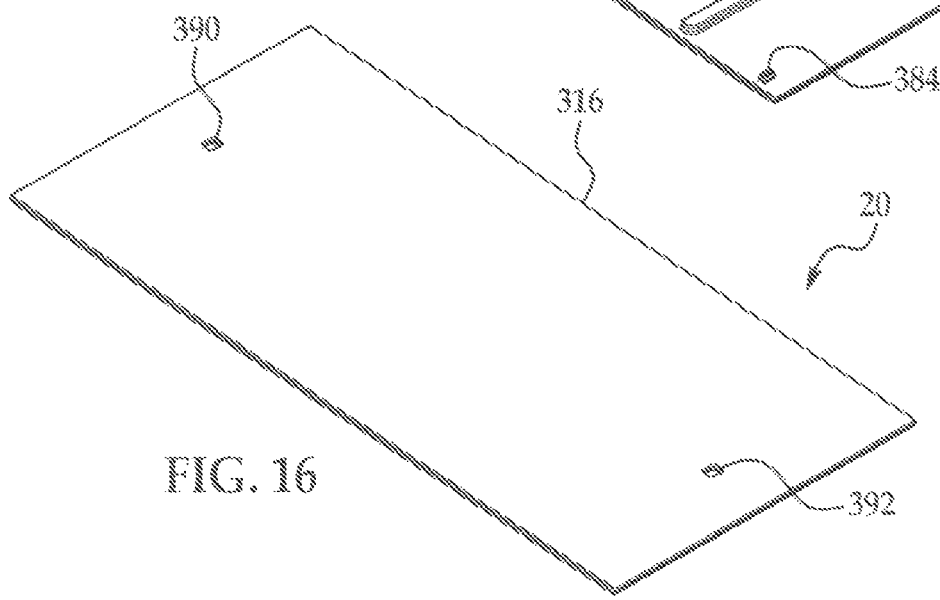
FIG. 16 is a schematic of a second side of the second endcap member of the battery cell carrier assembly of FIG. 1.

Referring to FIGS. 15 and 16, the endcap member 20 is configured to be coupled to the battery cell carrier 12. The endcap member 20 include a plate member 360, cross-members 362, 364, 366, 368, 370, 372, positioning labs 380, 382, 384, 386. In one exemplary embodiment, the endcap member 20 is constructed from plastic.

The plate member 360 is substantially rectangular shaped and has an outer periphery substantially the same size as an outer periphery of the panel member 46. The plate member 360 includes apertures 390, 392 extending therethrough for receiving latching members 188, 190 of the panel member 46 for coupling the plate member 362 the panel member 46.

The cross-members 362, 364, 366, 368, 370, 372 are provided to support the panel member 46 thereon. The cross-members 362, 364, 366, 368, 370, 372 extend transversely on the plate member 360 and are disposed apart from one another and are generally parallel to one another.

Referring to FIGS. 3 and 15, the positioning tabs 380, 382, 384, 386 are provided to position the endcap member 20 at a desired position with respect to the panel member 46. In particular, the positioning tabs 380, 382, 384, 386 extend from the bottom surface 387 of the endcap member 20. The positioning tabs 380, 382, 384, 386 are positioned on the top surface 387 such that the tabs 380, 382, 384, 386 are disposed adjacent (e.g., side by side) associated positioning tabs 180, 182, 184, 186 on the panel member 46 for positioning the endcap member 20 relative to the panel member 46.

Figure 17:
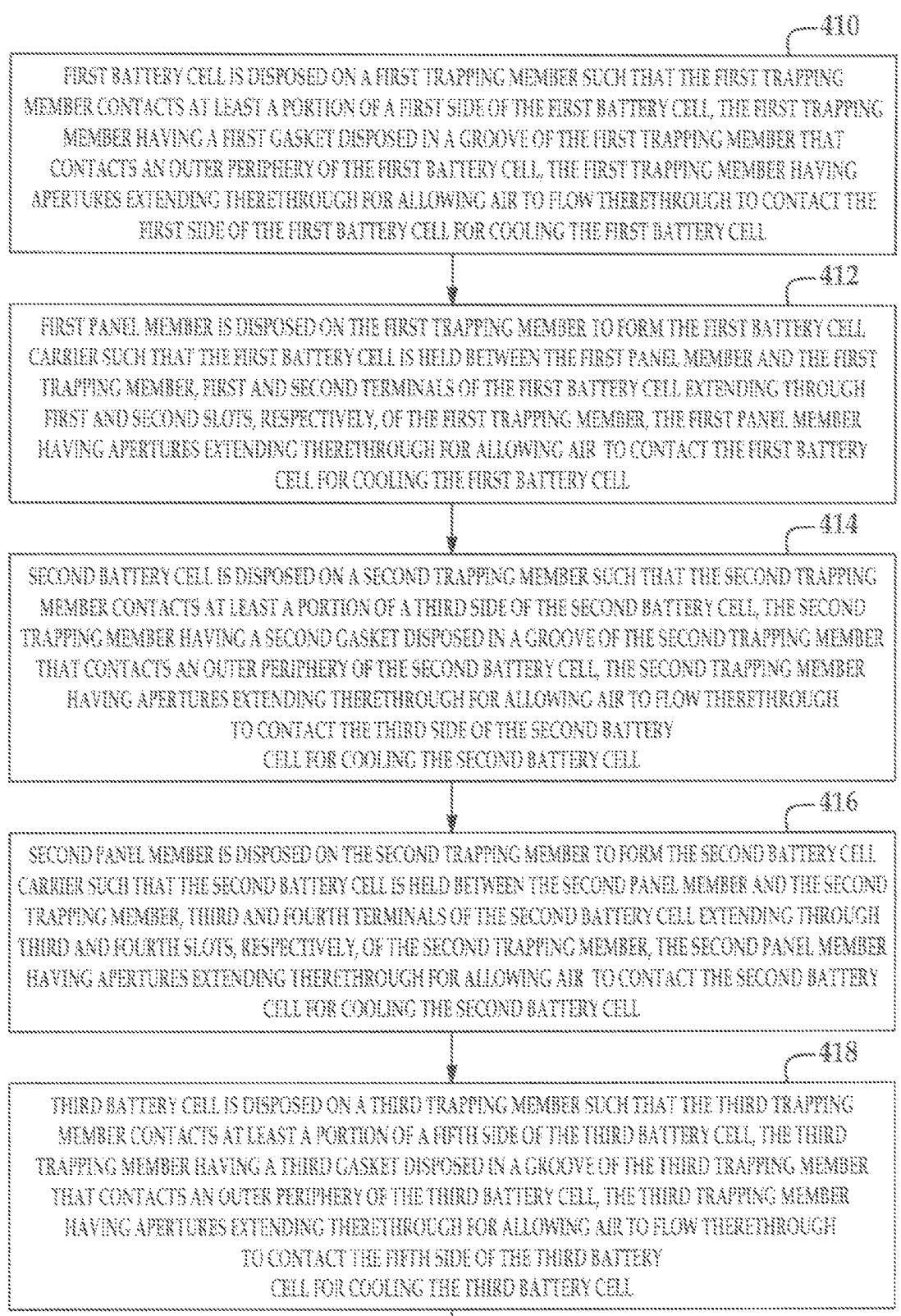
FIGS. 17-18 are flowcharts of a method for assembling the battery cell carrier assembly of FIG. 1 in accordance with another exemplary embodiment.
Figure 18:
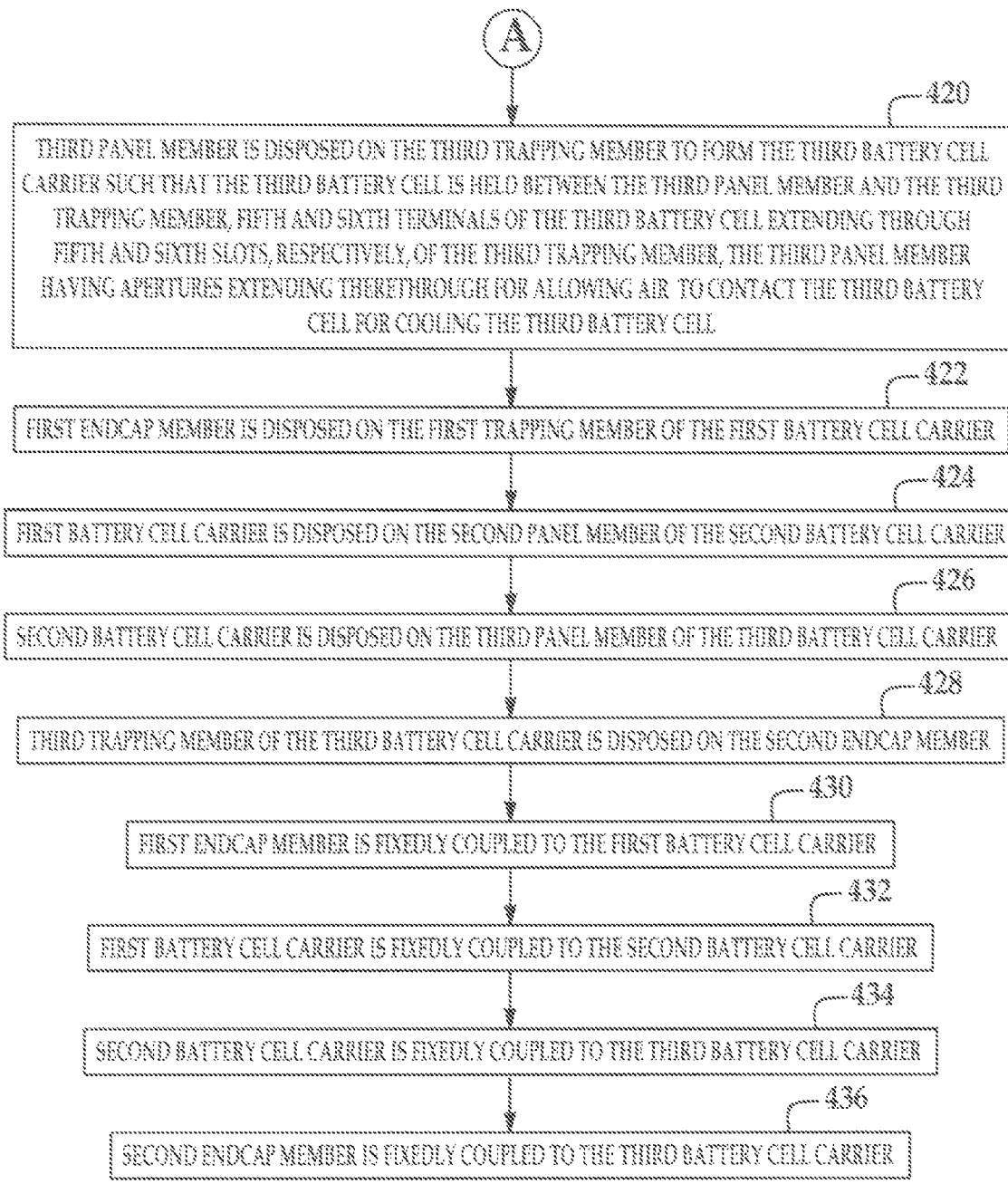

Referring to FIGS. 17-18 a flowchart of a method for assembling the battery cell carrier assembly 10 will now be explained.

At step 410, the battery cell 44 is disposed on the trapping member 40 such that the trapping member 40 contacts at least a portion of a first side of the battery cell 44. The trapping member 40 has a gasket 42 disposed in the groove 102 of the trapping member 40 that contacts an outer periphery of the battery cell 44. The trapping member 40 has apertures extending therethrough for allowing air to flow therethrough to contact the first side of the battery cell 44 for cooling the battery cell 44.

At step 412, the panel member 46 is disposed on the trapping member 40 to form the battery cell carrier 12 such that the battery cell 44 is held between the panel member 46 and the trapping member 40. Terminals 144, 146 of the battery cell 44 extend through slots 126, 128, respectively, of the trapping member 40. The panel member 46 has apertures extending therethrough for allowing air to contact the battery cell 44 for cooling the battery cell 44.

At step 414, battery cell 244 is disposed on a trapping member 240 such that the trapping member 240 contacts at least a portion of a side of the battery cell 244. The trapping member 240 has the gasket 242 disposed in a groove of the trapping member 240 that contacts an outer periphery of the battery cell 244. The trapping member 240 has apertures extending therethrough for allowing air to flow therethrough to contact a side of the battery cell 244 for cooling the battery cell 244.

At step 416, panel member 246 is disposed on the trapping member 240 to form the battery cell carrier 14 such that the battery cell 244 is held between the panel member 246 and the trapping member 240. Terminals 260, 262 of the battery cell 244 extend through slots of the trapping member 240. The panel member 246 has apertures extending therethrough for allowing air to contact the battery cell 244 for cooling the battery cell 244.

At step 418, the battery cell 284 is disposed on the trapping member 280 such that the trapping member 280 contacts at least a portion of the battery cell 284. The trapping member 280 has a gasket 282 disposed in a groove of the trapping member 280 that contacts an outer periphery of the battery cell 284. The trapping member 280 has apertures extending therethrough for allowing air to flow therethrough to contact the battery cell 284 for cooling the battery cell 284.

At step 420, the panel member 280 is disposed on the trapping member 280 to form the battery cell carrier 16 such that the battery cell 284 is held between the panel member 286 and the trapping member 280. Terminals 290, 292 of the battery cell 284 extend through slots of the trapping member 280. The panel member 286 has apertures extending therethrough for allowing air to contact the battery cell 284 for cooling battery cell 284.

At step 422, of the endcap member 20 is disposed on the trapping member 40 of the battery cell carrier 12.

At step 424, the battery cell carrier 12 is disposed on the panel member 246 of the battery cell carrier 14.

At step 426, the battery cell carrier 14 is disposed on the panel member 286 of the battery cell carrier 16.

At step 428, the trapping member 280 of the battery cell carrier 16 is disposed on the endcap member 18.

At step 430, the endcap member 20 is fixedly coupled to the battery cell carrier 12. In one exemplary embodiment, the endcap member 20 is ultrasonically welded to the battery cell carrier 12.

At step 432, the battery cell carrier 12 is fixedly coupled to the battery cell carrier 14. In one exemplary embodiment, the battery cell carrier 12 is ultrasonically welded to the battery cell carrier 14.

At step 434, the battery cell carrier 14 is fixedly coupled to the battery cell carrier 16. In one exemplary embodiment, the battery cell carrier 14 is ultrasonically welded to the battery cell carrier 16.

At step 436, the endcap member 310 is fixedly coupled to the battery cell carrier 16. In one exemplary embodiment, the endcap member 310 is ultrasonically welded to the battery cell carrier 16.

The battery cell carrier assembly 10 can having battery cell carriers 12, 14, 16 represents a substantial advantage over other assemblies. In particular, the battery cell carriers 12, 14, 16 provide a technical effect of holding battery cells therein while providing apertures for allowing air to cool the battery cells. Thus, a temperature of the battery cells can be maintained less than a threshold temperature to prevent the battery cells from being degraded by excess heat.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery cell carrier for holding a battery cell therein, the battery cell having a first side and a second side opposite the first side, comprising:

a trapping member configured to contact at least a portion of the first side of the battery cell, the trapping member having a rectangular ring-shaped peripheral wall defining an inner region, the trapping member further having a plurality of cross-members coupled to the peripheral wall and extending across the inner region, the rectangular ring-shaped peripheral wall and the plurality of cross-members defining at least one aperture for allowing air to flow therethrough to contact the first side of the battery cell for cooling the battery cell, the rectangular ring-shaped peripheral wall having a groove configured to receive a gasket therein, the rectangular ring-shaped peripheral wall further having a venting aperture extending therethrough, the gasket being disposed at least partially in the groove of the rectangular ring-shaped peripheral wall such that the gasket contacts the battery cell when a panel member engages the trapping member, and a portion of the gasket being removed proximate to the venting aperture such that the venting aperture vents any gases escaping from the battery cell; and the panel member configured to contact at least a portion of the second side of the battery cell, the panel member further configured to engage a portion of the trapping member such that the battery cell is held between the panel member and the trapping member, the panel member having at least one aperture extending therethrough for allowing air to flow therethrough to contact the second side of the battery cell for cooling the battery cell, the panel member further having a first rectangular ring-shaped peripheral wall having a first groove therein, and the rectangular ring-shaped peripheral wall of the trapping member having an engagement portion which engages the first groove to couple the trapping member to the panel member.

2. The battery cell carrier of claim 1, wherein the rectangular ring-shaped peripheral wall of the trapping member further has a first slot extending therethrough at a first end of the trapping member and a second slot extending therethrough at a second end of the trapping member, the first and second slots configured to receive first and second terminals, respectively, of the battery cell therethrough.

3. The battery cell carrier of claim 1, wherein the gasket has a circular cross-sectional profile and the groove of the rectangular ring-shaped peripheral wall of the trapping member has a width larger than a diameter of the gasket.

4. The battery cell carrier of claim 1, wherein the first rectangular ring-shaped peripheral wall defines an inner region of the panel member, the panel member further having a plurality of cross-members coupled to the first rectangular ring-shaped peripheral wall and extending across the inner region of the panel member.

5. A battery cell carrier assembly for holding first and second battery cells therein, comprising:

a first battery cell carrier having a first trapping member and a first panel member, the first trapping member configured to contact at least a portion of a first side of the first battery cell, the first trapping member having a peripheral wall defining an inner region, the first trapping member further having a plurality of cross-members coupled to the peripheral wall and extending across the inner region, the peripheral wall and the cross-members defining at least one aperture for allowing air to flow therethrough to contact the first side of the first battery cell for cooling the first battery cell, the peripheral wall having a groove configured to receive a gasket therein, the peripheral wall further having a venting aperture extending therethrough, the gasket being disposed at least partially in the groove such that the gasket contacts the first battery cell when the first panel member engages the first trapping member, and a portion of the gasket being removed proximate to the venting aperture such that the venting aperture vents any gases escaping from the first battery cell, the first panel member configured to contact at least a portion of a second side of the first battery cell opposite the first side, the first panel member further includes a first rectangular ring-shaped peripheral wall having a first groove therein, and the peripheral wall of the first trapping member having an engagement portion which engages the first groove to couple the first trapping member to the first panel member such that the first battery cell is held between the first panel member and the first trapping member, the first panel member having at least one aperture extending therethrough for allowing air to flow therethrough to contact the second side of the first battery cell for cooling the first battery cell; and a second battery cell carrier having a second trapping member and a second panel member, the second trapping member configured to engage the first panel member of the first battery cell carrier, the second trapping member further configured to contact at least a portion of a third side of the second battery cell, the second trapping member having at least one aperture extending therethrough for allowing air to flow therethrough to contact the third side of the second battery cell, the second panel member configured to contact at least a portion of a fourth side of the second battery cell opposite the third side, the second panel member further configured to engage a portion of the second trapping member such that the second battery cell is held between the second panel member and the second trapping member, the second panel member having at least one aperture extending therethrough for allowing air to flow therethrough to contact the fourth side of the second battery cell for cooling the second battery cell.

6. The battery cell carrier assembly of claim 5, wherein the peripheral wall has a first slot extending therethrough at a first end of the first trapping member and a second slot extending therethrough at a second end of the first trapping member, the first and second slots configured to receive first and second terminals, respectively, of the first battery cell therethrough.

* * * * *